(12) United States Patent
Shi

(10) Patent No.: US 6,749,679 B2
(45) Date of Patent: Jun. 15, 2004

(54) COMPOSITION OF MATERIALS FOR PRODUCTION OF ACID RESISTANT CEMENT AND CONCRETE AND METHODS THEREOF

(75) Inventor: Caijun Shi, Burlington (CA)

(73) Assignee: Advanced Materials Technologies, LLC, Hamburg, NY (US)

( * ) Notice: Subject to any disclaimer, the term of this patent is extended or adjusted under 35 U.S.C. 154(b) by 174 days.

(21) Appl. No.: 10/055,554

(22) Filed: Jan. 23, 2002

(65) Prior Publication Data

US 2003/0136305 A1 Jul. 24, 2003

(51) Int. Cl.$^7$ .......................... C04B 14/04; C04B 14/22
(52) U.S. Cl. ...................... 106/600; 106/602; 106/705; 106/716; 106/737; 106/792; 106/793; 106/DIG. 1
(58) Field of Search ................... 106/600, 602, 106/705, 716, 737, 792, 793, DIG. 1

(56) References Cited

U.S. PATENT DOCUMENTS

| | | |
|---|---|---|
| 4,642,137 A | 2/1987 | Heitzmann et al. |
| 5,378,278 A | 1/1995 | Colburn |
| 5,482,549 A | 1/1996 | Blaakmeer et al. |
| 5,698,026 A | 12/1997 | Boaz |
| 5,702,520 A | 12/1997 | Boaz |
| 5,810,921 A | 9/1998 | Baxter et al. |
| 5,938,834 A | 8/1999 | Boaz |
| 6,176,919 B1 | 1/2001 | Mason |
| 6,296,699 B1 | 10/2001 | Jin |

FOREIGN PATENT DOCUMENTS

| | | |
|---|---|---|
| CN | 1088598 | 6/1994 |
| CN | 1093351 | 10/1994 |
| CN | 1148578 | 4/1997 |
| CN | 1172084 | 2/1998 |
| JP | 52081332 | 7/1977 |
| JP | 59207858 | 11/1984 |
| PL | 100776 | 11/1978 |
| RO | 115716 | 5/2000 |
| SU | 1320200 | 6/1987 |
| WO | WO 2000044685 | 8/2000 |

OTHER PUBLICATIONS

B. Talling and J. Brandstetr, Present State and future of Alkali–Activated Slag Concretes, Fly Ash, Silica Fume, Slag, and Natural Pozzolans in Concrete, Proceedings Third International Conference, Trondheim, Norway, 1989, vol. 2, American Concrete Institute, Detroit.

*Primary Examiner*—Paul Marcantoni
(74) *Attorney, Agent, or Firm*—Hodgson Russ LLP

(57) ABSTRACT

A cement composition for use in acidic environment containing liquid alkali silicate, vitreous silicate setting agent, lime containing material and inert filler and building materials made therefrom as well as the method of making such building materials. The liquid alkali silicate may include sodium silicate or potassium silicate. The vitreous silicate setting agent may include soda-lime glass powder or coal fly ash. The lime containing material refers to the materials containing more than 20% lime and may include quicklime, hydrated lime, Portland cement, blast furnace slag or steel slag. The inert fillers include ground quartz, ground ceramic, and/or clay.

20 Claims, No Drawings

US 6,749,679 B2

COMPOSITION OF MATERIALS FOR PRODUCTION OF ACID RESISTANT CEMENT AND CONCRETE AND METHODS THEREOF

FIELD OF THE INVENTION

This invention relates in general to compositions and a method of use of such compositions to produce cement pastes, mortars and concrete, which are resistant to corrosion in an acidic environment.

BACKGROUND OF THE INVENTION

Durability is one of the most important concrete design criteria in most cases. Common durability problems include chloride ion penetration leading to corrosion of reinforcing steels, alkali-aggregate reaction, freeze-thaw attack, sulphate attack, carbonation, acid corrosion, etc.

The acid corrosion of hardened cement and concrete materials has drawn more and more attention recently due to the corrosion of concrete sewer pipes and concrete structures at municipal wastewater treatment plants, chemical plants, coke ovens and steel plants. Further the impact of animal feed and manure are of concern regarding the acid corrosion resistance of concrete. Conventional Portland cement concrete corrodes relatively quickly in an acidic environment. Some limited research results have indicated that the use of supplementary cementing materials such as silica fume, fly ash and ground blast furnace slag can improve the resistance to acid attack of concrete. pH adjustment and corrosion resistant linings are often used for concrete sewer pipes and concrete structures at municipal wastewater treatment plants at a substantial additional cost.

A recent study conducted by Shi and Stegemann entitled "Acid Corrosion Resistance of Different Cementing Materials" and published in Cement and Concrete Research, Vol. 30, No. 5, (2000) indicates that the corrosion of conventional cementing materials in acid solutions depends on the nature of the hydration products rather than the porosity of the hardened cementing materials. Up to now, the widely held belief has been that a high alkalinity of cement improves a cement's acid corrosion resistance and improves the acid neutralization capacity of the material. For example, the USEPA Toxicity Characteristic Leaching Procedure [Federal Register, 1986] examines the solubility of metals upon addition of a limited amount of acid and is usually used to evaluate the resistance of cement-solidified wastes in an acidic environment. In fact, passivation by deposition of reaction products plays an important role in corrosion resistance and prevents the matrix from further corrosion. Some cementing materials may have low acid neutralization capacity, but high acid corrosion resistance due to the passivation effect.

Acid resistant cement and concrete are known in the art. Early acid resistant cements mainly consisted of liquid sodium silicate as a binder, sodium hexafluorosilicate as a setting agent for liquid alkali silicate and ground quartz or silica flour as a filler. In the past, sodium hexafluorosilicate was a readily available by-product from production of phosphate fertilizers. Now, however, it is difficult to economically obtain this material due to changes in the production of phosphate fertilizers. Other disadvantages with presently known acid resistant cements are that they exhibit low strength if cured at temperatures over 35° C., the cement needs to be cured in a dry environment instead of moist environment, and the hardened cement does not show good resistance to water or dilute acids unless an acid treatment is carried out before being exposed to those environments.

U.S. Pat. No. 4,138,261 to Adrian et al. discloses the use of condensed aluminum phosphates as hardeners for liquid alkali silicates. U.S. Pat. No. 4,482,380 to Schlegel discloses aluminum iron phosphates as hardeners for liquid sodium or potassium silicate. The hardeners have an atomic Al/Fe ratio of 0.052 to 95 and an atomic P/(Al+Fe) ratio of 0.9 to 3, and the cement is waterproof 16 days after it is manufactured. This patent does not discuss the acid resistance of the cement. In fact, both condensed aluminum phosphates and aluminum iron phosphates are very expensive. U.S. Pat. No. 4,221,597 to Mallow discloses the use of a spray dried hydrated sodium silicate powder instead of liquid sodium silicate for the manufacture of acid resistant cement. However, it does not overcome any disadvantages as mentioned above.

U.S. Pat. No. 5,989,330 to Semler et al. discloses an acid resistant cement composition composed of a colloidal silica sol and an acid resistant particulate aggregate without any setting agent. This cement has to be pre-cured and is mainly suitable for use as a mortar in acidic autoclave environments.

U.S. Pat. No. 5,352,288 to Mallow discloses an acid resistant cement comprised of, by weight, 1 to 1.5 parts of calcium oxide material containing at least about 60% CaO, 10 to 15 parts of pozzolanic materials containing at least 30% amorphous silica and 0.025 to 0.075 parts of alkaline metal catalyst. However, after an immersion of the invented material in a 0.70 pH sulfuric acid for two weeks, a white softened skin about 1/32" deep forms on the surface of the tested samples.

Alkali-activated cement and concrete using sodium silicate as an activator, and blast furnace slag, fly ash and/or waste glass as a cementing component, are well known in the art. There are many publications related to these materials used in cementitous compositions. Generally speaking, a literature review and research by Shi and Stegemann published in Cement and Concrete Research indicates that these materials provide a cement with better acid corrosion resistance than conventional cement concrete, but they still corrode in strong acidic environments.

U.S. Pat. No. 5,601,643 to Silverstrim et al. relates to a cementitious mixture comprising Class F fly ash and an alkali metal or alkaline earth metal silicate, which sets rapidly and gives high strength under elevated temperature. U.S. Pat. No. 6,296,699 to Jin relates to the production of a binder using waste glasses activated by sodium silicate with a $SiO_2:Na_2O$ weight ratio between about 1.6:1 to about 2.0:1. however the weight ratio of $SiO_2:Na_2O$ should be below 2, otherwise, the activated cementing material will set too fast to be useful [Jolicoeur et al., Advances in Concrete Technology, Natural Resources Canada, pp. 483–514, 1992]. Although those binders can give high strength, they are not stable in moist conditions. Also, they display serious effluence problems because of low $SiO_2:Na_2O$ ratios.

The silicate anions in the liquid sodium silicate exist in different forms of polysilicate ions with the silicon atom being equal to or greater than one, depending on the $SiO_2/Na_2O$ ratio, pH, concentration and temperature. The lower the $SiO_2/Na_2O$ ratio, the lower the degree of polymerization of silicate ions. A detailed description in the book—*The Chemistry of Silica—Solubility, Polymerization, Colloid and Surface Properties, and Biochemistry* by R. K. Iler points out that a monomic silicate ion is highly soluble while amorphous silica consisting of highly polymerized silicate ions has very low solubility in water and strong acid solutions. The presence of sodium hexafluorosilicate essentially makes the silicate species in the solution having a low degree of polymerization form highly polymerized silicates with excellent resistance to strong acid solution.

When the $SiO_2/Na_2O$ ratio in a silicate solution is lower than 2, the solution has a high pH and consists mainly of monomers and dimers. Table 1 shows the effect of $SiO_2/Na_2O$ ratio on the degree of polymerization of silicate ions in a cementitious solution. It can be seen that with a $SiO_2/Na_2O$ ratio of 2.2, the degree of polymerization is much higher than with a ratio of 2 or less, and that the degree of polymerization increases drastically with the ratio thereafter. Thus, according to the present invention, it is important to use a sodium silicate solution with a ratio greater than 2 in an acid resistant concrete. This enables the silicate ions in the concrete to reach a high degree of polymerization and exhibit improved resistance to acid attack.

TABLE 1

Molar Ratio and Degree of Polymerization
(from The Chemistry of Silica - Solubility,
Polymerization, Colloid and Surface Properties, and
Biochemistry by R. K. Iler)

| Molar Ratio $SiO_2/Na_2O$ | Degree of Polymerization | Mol. Wt as $SiO_2$) |
|---|---|---|
| 2.0 | 2.5 | 150 |
| 2.2 | 3 | 180 |
| 2.6 | 7 | 420 |
| 3.1 | 15 | 900 |
| 4.0 (extrapolated) | 27 | 1600 |

A silicate polymerization analysis by Zhong and Yang [Bulletin of Chinese Ceramic Bulletin, Vol. 23, No. 6, 1993], on hardened sodium silicate-activated slag using low $SiO_2:Na_2O$ ratios indicates that the hardened pastes still contain a significant amount of monomer after 180 days of hydration. Generally, monomers are soluble in acidic solutions. Thus, cementing materials using sodium silicate with a low $SiO_2:Na_2O$ ratio as an activator may exhibit improved acidic resistance in comparison to conventional concrete, but are not completely acid resistant, especially in highly acidic environments.

In that respect, the present invention sets forth that only a cementitious composition using liquid silicate with a high alkali-to-silica ratio as a binder is resistant to attack from a strong acidic environment. The key point is to identify a technically and economically feasible setting or polymerization agent to polymerize the silicate anions in the solution to form large molecular silicates having excellent acid-resistance. Setting agents, which are cheap, environmentally friendly, and technically sound are available. Such setting agents include powdered recycled glasses or coal fly ash. Many cities in North American cannot find applications for recycled mixed glasses, which are mainly soda-lime silicate glasses, and must landfill all or part of them. Coal fly ash is also widely available at very low cost. Notwithstanding this, the prior art does not disclose or even hint at the use of sodium-lime silicate glasses as setting agents for liquid sodium silicate. Furthermore, the prior art does not mention improvements in moisture and high temperature curing of acid resistant cement.

SUMMARY AND OBJECT OF THE INVENTION

In view of the foregoing limitations and shortcomings of conventional concretes, there exists a need to develop alternative acid resistant concretes which use inexpensive and environmentally friendly raw materials and can be cured at elevated temperatures.

More particularly, it is a purpose of this invention to provide a method of manufacturing a cement capable of resistance to water, dilute acid solutions and strong acid solutions without any prior treatment.

A further objective of this invention is the ability to cure cement pastes, mortars and concretes in a moist saturated environment.

A further objective of this invention is the ability to cure cement pastes, mortars and concretes in moist conditions and at elevated temperatures to acquire high early strength.

Yet another objective of this invention is to provide an alternative which can use inexpensive recycled materials.

The aforementioned objectives are achieved by an acid resistant cement in accordance with the present invention.

Briefly, therefore, the invention is directed to a type of cement which can be cured in steam at room and elevated temperatures, is characterized by excellent mechanical properties and is resistant to acid attack corrosion. The cements according to the present invention are composed of a liquid alkali silicate with a $SiO_2$ to $Na_2O$ or $K_2O$ ratio ranging from at least about 2.2 to about 3.0:1 and present at about 20% to about 50%, by weight; a vitreous silicate present at about 10% to about 50%, by weight, as a hardener; a lime containing material present at about 2% to about 20%, by weight and from about 10% to about 40%, by weight, of an inert filler. Water may be required to produce workable mixtures. The amount of water utilized for a particular composition and manufacturing procedure is readily determined by routine experimentation. The hardened cement, mortar or concrete can be cured in either a dry or moist environment at room or elevated temperatures, and can be contacted by water or dilute acid without any pretreatment.

One of the important constituents of the cement of the present invention, and which further distinguishes it from prior art cements, is the use of a lime containing material serving as a property modifier. This constituent may include hydrated lime, quick lime, ground granulated blast furnace slag, ground steel slag, or Portland cement. On one hand, these modifier materials accelerate the condensation of liquid silicates and act as a hardener for liquid water glass. On the other hand, they improve the moisture and high temperature curing properties of the cement, and enable the concrete to withstand direct contact with water and dilute acid without any pretreatment.

With the forgoing and other objects, features and advantages of the invention that will become hereinafter apparent, the nature of the invention may be more clearly understood by reference to the following detailed description of presently preferred mechanical embodiments of the invention and the appended claims given for the purpose of disclosure.

DESCRIPTION OF THE PREFERRED EMBODIMENTS

The essential materials in the present invention are the liquid alkali silicate, setting agent and lime containing material. An additional component such as inert filler can be utilized.

The formulation of the present cement composition includes liquid sodium or potassium silicate with a $SiO_2$ to $Na_2O$ or $K_2O$ ratio ranging from about 2.2 to about 3.0. If the ratio is too low, it may result in higher strengths, but the hardened cement pastes, mortars or concretes have poor resistance to acid attack. If the ratio is too high, the viscosity of the liquid silicate and the formulated mixtures increases, which affects the workability of cement paste, mortar or concrete mixtures.

As used herein, the setting agent is vitreous silicates, which include recycled glasses or coal fly ash. Preferably, a waste material such as recycled glasses is used. Preferred recycled glasses are container glasses and plate glasses, which have at least 90% of their particles passing 100 Mesh.

Based on ASTM C618, coal fly ash is classified into Class C and Class F categories. Fly ash belongs to Class F if it contains greater than 70% of the sum of $SiO_2+Al_2O_3+Fe_2O_3$, and to Class C if it contains between 50% and 70% of the sum of $SiO_2+Al_2O_3+Fe_2O_3$. Usually, Class F fly ashes have a lower content of CaO and exhibit pozzolanic properties, but Class C fly ashes contain a high content of CaO and exhibit cementitious properties. Since Class C fly ash has cementitious properties, it can be used as a binder directly. Class F fly ash is a pozzolanic material and possesses little or no cementitious value but will, in the presence of moisture, chemically react with calcium hydroxides at ordinary temperatures to form compounds possessing cementitious properties. In this invention, it is preferred that a Class F fly ash with a carbon content of less than 6% be used.

When ground glass or fly ash is mixed with a silicate solution, some cations such as $Ca^{2+}$, $Mg^{2+}$, $K^+$, $Na^+$, etc., of the glass or fly ash are dissolved into the solution and destroy its electronic balance. This results in the formation of a highly polymerized silicate. The glass or fly ash particles act as nucleation centers for the polymerization of silicate ions.

The lime containing material should contain more than about 20% CaO. It can be any one or a combination of the materials such as blast furnace slag, steel slag, Portland cement, cement kiln dust, quicklime or hydrated lime. The use of these materials has also been found to be important to the steam curing properties, and resistance to water and dilute acid solution of the product concrete.

An inert filler material selected from the group consisting of silica flour, ground ceramics, clays, and mixture thereof, is also used in the cement mixture. The inert filler decreases the amount of ground vitreous material and increases the acid resistance of the final cement. Silica flour is preferred since acts as a nucleation center for the polymerization of silicate anions in the solution.

The cementitious construction material also preferably includes a fibrous material selected from the group consisting of ceramic, graphite, steel, cellulose fibers, synthetic organic fibers, and mixtures thereof.

Additional water may be required to produce workable mixtures. The amount of water utilized for a particular composition and manufacturing procedure is readily determined by routine experimentation.

Further illustrations of the characteristics and practical advantages of the compositions described in this invention are provided in the following examples:

EXAMPLE I

A batch (Batch 1) of samples was made with 100 parts of liquid sodium silicate (with a ratio of $SiO_2$ to $Na_2O$ of 2.58), 120 parts of ground recycled plate glass and 270 parts of fine quartz sand. In another batch (Batch 2), 50 parts of ground blast furnace slag was added in addition to those materials described above for Batch 1. The dry materials were first blended uniformly, and liquid sodium silicate was then mixed with the dry blended material. No additional water was added. The mixtures were cast into a plurality of 2"×2"×2" cubes. After 4 hours of still time in a sample preparation room, the cubes with molds were placed into a heated dry chamber for 15 hours of curing at 85° C.

At the end of the curing period, the cubes from Batches 1 and 2 were cooled to room temperature and demolded. Three cubes from each of Batches 1 and 2 were tested for compressive strength. Another six samples from each batch were immersed in water. The results in Table 2 indicate that the addition of ground blast furnace slag increased the strength of the cement mortars significantly. After 28 days of immersion in water, the strength of the Batch 1 samples decreased to approximately 30% of the strength before water immersion. However, the strength of the Batch 2 samples with ground blast furnace slag did not show a significant change in strength. This indicates that the addition of ground blast furnace slag improves the water resistance of the hardened cement mortars.

TABLE 2

Effect of the Addition of Blast Furnace Slag on the Strength of the Cement before and after Water Immersion

|  | Batch 1 | Batch 2 |
| --- | --- | --- |
| Composition (Parts by weight) |  |  |
| Liquid sodium silicate (ratio of 2.58) | 100 | 100 |
| Ground recycled glass | 120 | 120 |
| Ground granulated blast furnace slag | 0 | 50 |
| Fine quartz sand | 270 | 270 |
| Compressive Strength (MPa) |  |  |
| After 15 hours of dry curing at 85° C. | 36.0 | 54.4 |
| Immersion in water 28 days after the dry curing | 13.1 | 52.1 |

EXAMPLE II

Batches 3 and 4 were prepared having the respective compositions listed in Table 3. Batch 3 comprised 65 parts of liquid sodium silicate (with a ratio of $SiO_2$ to $Na_2O$ of 2.58), 120 parts of ground recycled plate glass, 15 parts of ground granulated blast furnace slag and 270 parts of fine quartz sand. In Batch 4, some ground quartz replaced the ground glass of the Batch 3 samples. Accordingly, the Batch 4 samples comprised 65 parts of liquid sodium silicate (with a ratio of $SiO_2$ to $Na_2O$ of 2.58), 80 parts of ground recycled plate glass, 40 parts of ground quartz, 10 parts of ground granulated blast furnace slag and 270 parts of fine quartz sand. The dry materials for each of Batches 3 and 4 were first blended uniformly. Next, water was added into the liquid sodium silicate and mixed uniformly. Then, the diluted sodium silicate was mixed into the dry blended materials.

The mixtures were cast into a plurality of 2"×2"×2" cubes. After 4 hours of still time in a sample preparation room, the cubes with molds were placed into heated chambers for curing. Some cubes were cured in a moisture chamber at 85° C., while others were cured in a dry chamber at 85° C. A batch of conventional Portland cement mortars was also prepared and cured in the moisture chamber as a reference.

After 15 hours of elevated temperature curing, the test cubes were cooled to room temperature and demolded.

Three cubes from each curing chamber were tested for compressive strength. Cubes from Batch 3 were immersed in either a 10% $H_2SO_4$ or a 40% $H_2SO_4$ bath. The results in Table 3 indicated that the strength of specimens dropped slightly after 28 days of immersion in 10% $H_2SO_4$, but cracked in the 40% $H_2SO_4$ bath after that amount of time.

TABLE 3

| Composition (Parts by weight) | Batch 3 | Batch 4 |
|---|---|---|
| Liquid sodium silicate (ratio of 2.58) | 65 | 65 |
| Ground recycled glass | 120 | 80 |
| Ground granulated blast furnace slag | 15 | 10 |
| Silica flour | 0 | 40 |
| Fine quartz sand | 270 | 270 |
| Water | 17 | 15 |

The results for Batch 4 in Table 4 indicate that there is no significant difference in strength for the cubes cured in dry or moisture conditions. Six steam cured cubes were immersed in water, 10% $H_2SO_4$ and 40% $H_2SO_4$ solutions, respectively. The change in mass of these cubes was then monitored. After 28 days, the water cured cubes immersed in water and 10% $H_2SO_4$ solution showed a strength decrease of 10% and 20%, respectively, while the water cured cubes immersed in 40% $H_2SO_4$ solution did not exhibit any strength change. Visual examination did not identify any deterioration on the surface of any of these test cubes.

TABLE 4

Strength of Acid Resistant Cement Mortar Before and After Acid Immersion

| Compressive Strength (MPa) | Batch 3 | Batch 4 |
|---|---|---|
| After 15 hours of dry curing at 85° C. | — | 33.9 |
| After 15 hours of steam curing at 85° C. | — | 31.1 |
| Immersion in water 28 days after steam | — | 28.8 |
| Immersion in 10% $H_2SO_4$ Solution for 28 days | 33.9 | 24.0 |
| Immersion in 40% $H_2SO_4$ solution for 28 days | small cracks | 31.6 |

The weight of the test cubes immersed in water and acid was monitored during the immersion test. It was found that the weight of these acid resistance cement mortar cubes changed less than 2% during the test in both 10% and 40% $H_2SO_4$. However, conventional Portland cement mortars dissolved completely after 2 weeks of immersion in a 10% $H_2SO_4$ solution. This means that the cement of the present invention is resistance to acid attack, especially when ground glasses are replaced with silica flour.

EXAMPLE III

The objective of this example was to show the acid corrosion resistance of concrete according to the present invention. As set forth in Tables 5 and 6, test sample preparation and curing of the Batch 5 concrete cubes was similar to that described in Example II, except that coarse quartz sand and quartz gravel was used instead of fine quartz sand. It can also be seen that steam or dry curing did not show a significant effect on the strength of the concrete. After 28 days of immersion in 10% $H_2SO_4$ solution, the Batch 5 cubes showed a slight increase in strength. Visual observation did not identify any deterioration on the surface.

TABLE 5

| Composition (Parts by weight) | Batch 5 |
|---|---|
| Liquid sodium silicate (ratio of 2.58) | 65 |
| Ground recycled glass | 80 |
| Ground granulated blast furnace slag | 10 |
| Silica flour | 40 |
| Coarse quartz sand | 241 |
| Quartz gravel | 362 |
| Water | 15 |

TABLE 6

Strength of Acid Resistant Cement Concrete Before and After Acid Immersion

| Compressive Strength (MPa) | |
|---|---|
| After 15 hours of dry curing at 85° C. | 26.6 |
| After 15 hours of steam curing at 85° C. | 24.4 |
| Immersion in 10% H2SO4 Solution for 28 days after dry curing | 29.7 |
| Immersion in 10% H2SO4 solution for 28 days after steam curing | 27.5 |

EXAMPLE IV

The objective of this example was to show the effect of the ratio of $SiO_2/Na_2O$ on acid corrosion resistance of concretes according to the present invention. As set forth in Table 7, test sample preparation and curing of the test cubes was similar to that described in Example III, except that sodium silicates with ratios of 2.0, 2.2 and 3.22 for respective Batches 6, 7 and 8 were used. However, Batch 8 with a $SiO_2/Na_2O$ ratio of 3.22 was too sticky to be mixed and poured into sample cubes. Thus, only Batches 6 and 7 were mixed and tested.

TABLE 7

| Composition (Parts by weight) | Batch 6 | Batch 7 | Batch 8 |
|---|---|---|---|
| Liquid sodium silicate (ratio of 2.0) | 65 | | |
| Liquid sodium silicate (ratio of 2.2) | | 65 | |
| Liquid sodium silicate (ratio of 3.22) | | | 65 |
| Ground recycled glass | 80 | 80 | 80 |
| Ground granulated blast furnace slag | 10 | 10 | 10 |
| Silica flour | 40 | 40 | 40 |
| Coarse quartz sand | 241 | 241 | 241 |
| Quartz gravel | 362 | 362 | 362 |
| Water | 15 | 15 | 15 |

After 15 hours of steam curing at 85° C., the specimens from Batches 6 and 7 were immersed in a 10% $H_2SO_4$ solution. The Batch 6 specimens cracked several days after immersion while the Batch 7 specimens showed very tiny cracks after 28 days in 10% $H_2SO_4$ solution. This means that the ratio of sodium silicate should be at least about 2.2 to about 3.0 in order to obtain good acid resistance. In this range, the silicate anions are highly polymerized, which manifests as an acid resistant cementitious mixture.

The foregoing has described the invention and certain embodiments thereof. It is to be understood that the invention is not necessarily limited to the precise embodiments described therein but variously practiced with the scope of the following claims.

I claim:

1. An acid resistant cement, which comprises:
   a) a liquid alkali silicate with a $SiO_2$ to $Na_2O$ or $K_2O$ ratio ranging from at least 2.2 to about 3.0:1 and present at about 20% to about 50%, by weight;
   b) a vitreous silicate present at about 10% to about 50%, by weight, as a hardener;
   c) a lime containing material present at about 2% to about 20%, by weight, and
   d) an inert filler at about 10% to 40%, by weight.

2. The composition of claim 1 wherein the vitreous silicate is a glass powder consisting essentially of ground container glass or plate glass.

3. The composition of claim 1 wherein the vitreous silicate is coal fly ash.

4. The composition of claim 1 wherein the lime containing material contains more than about 20% lime, by weight, and is selected from the group consisting of ground granulated blast furnace slag, ground steel slag, Portland cement, cement kiln dust, lime, and mixtures thereof.

5. The composition of claim 1 wherein the inert filler is selected from the group consisting of silica flour, ground ceramics, clays, and mixture thereof.

6. The composition of claim 1 including fibrous materials selected from the group consisting of ceramic, graphite, steel, cellulose fibers, synthetic organic fibers, and mixtures thereof.

7. A method for making acid resistant cement, comprising the steps of: mixing, by weight, a liquid alkali silicate having a $SiO_2$ to $Na_2O$ or $K_2O$ ratio ranging from at least 2.2 to about 3.0:1 and present at about 20% to about 50% with a vitreous silicate present at about 10% to about 50% as a hardener, an inert filler of about 10% to about 40% and a lime containing material present at about 2% to about 20%.

8. The method of claim 7 including providing the vitreous silicate as a glass powder consisting essentially of ground container glass or plate glass.

9. The method of claim 7 including providing the vitreous silicate as coal fly ash.

10. The method of claim 7 including providing the lime containing material containing more than about 20% lime, by weight, and being selected from the group consisting of ground granulated blast furnace slag, ground steel slag, Portland cement, cement kiln dust, lime, and mixture thereof.

11. The method of claim 7 including mixing a filler selected from the group consisting of silica flour, ground ceramics, clays, and mixture thereof.

12. The method of claim 7 including mixing a fibrous material selected from the group consisting of ceramic, graphite, steel, cellulose fibers, synthetic organic fibers, and mixtures thereof.

13. An acid resistant construction material, which comprises, by weight:
   a) a liquid alkali silicate with a $SiO_2$ to $Na_2O$ ratio of about 2.58:1 and present at about 20% to about 50%;
   b) a vitreous silicate present at about 10% to about 50% as a hardener;
   c) a lime containing material present at about 2% to about 20%, and
   d) an inert filler of 10% to 40%, by weight.

14. The acid resistant construction material of claim 13 wherein the vitreous silicate is a glass powder consisting essentially of ground container glass or plate glass.

15. The acid resistant construction material of claim 13 wherein the vitreous silicate is coal fly ash.

16. The acid resistant construction material of claim 13 wherein the lime containing material contains more than about 20% lime, by weight, and as selected from the group consisting of ground granulated blast furnace slag, ground steel slag, Portland cement, cement kiln dust, lime, and mixture thereof.

17. The acid resistant construction material of claim 13 further including a fibrous material selected from the group consisting of ceramic, graphite, steel, cellulose fibers, synthetic organic fibers, and mixtures thereof.

18. The acid resistant construction material of claim 13 characterized as having been cured at an elevated temperature.

19. The acid resistant construction material of claim 13 characterized as having been cured at an elevated temperature for at least about 5 hours.

20. The acid resistant construction material of claim 13 including a filler selected from the group consisting of silica flour, ground ceramics, clays, and mixture thereof.

* * * * *